June 23, 1970     E. SCHEER     3,517,143

ELECTRICAL PROGRAM CONTROL DEVICE FOR DOMESTIC APPLIANCES

Filed July 21, 1966     9 Sheets-Sheet 1

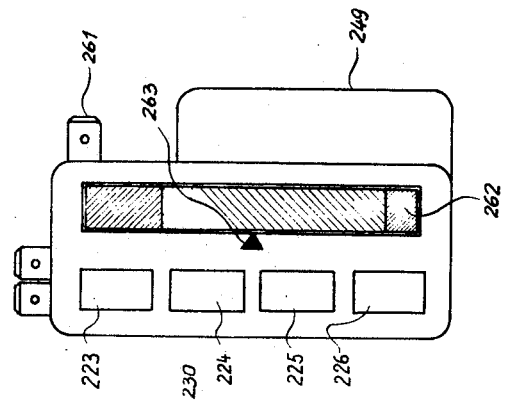
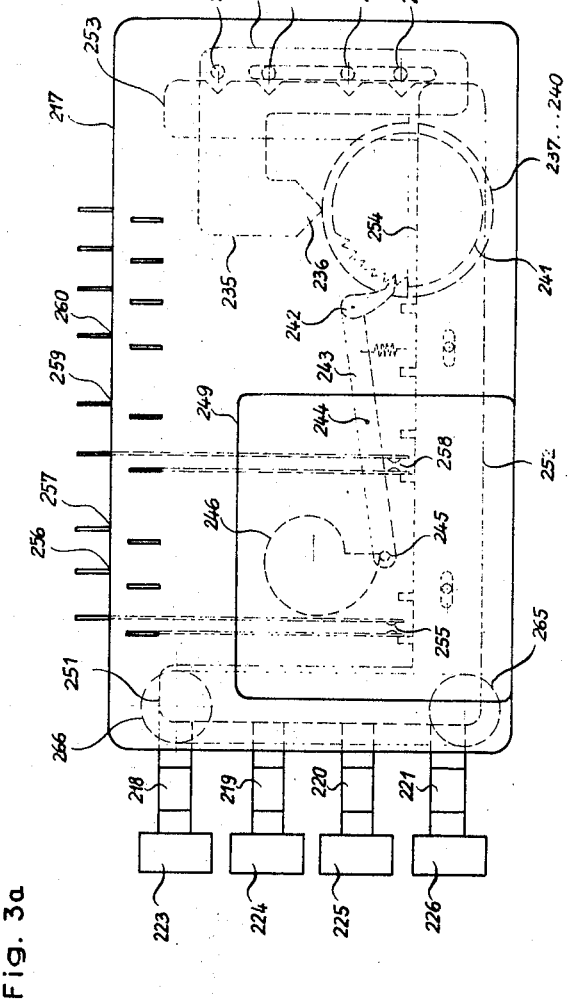
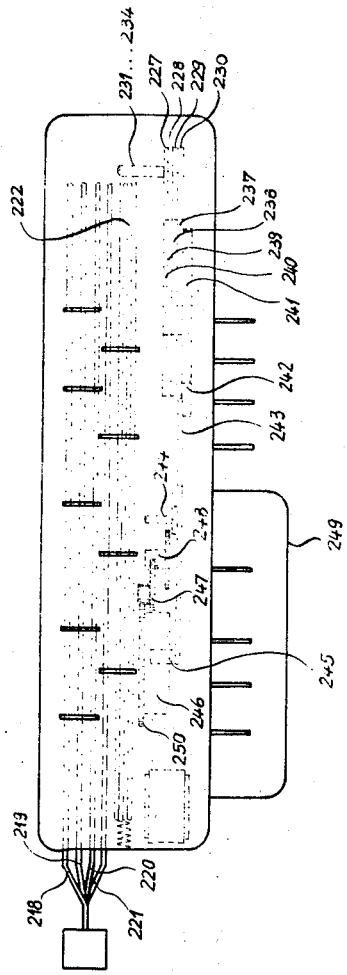

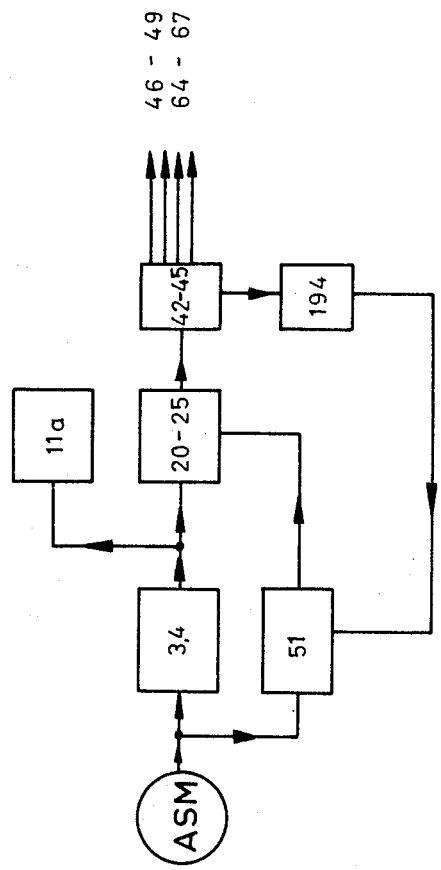

United States Patent Office 3,517,143
Patented June 23, 1970

3,517,143
ELECTRICAL PROGRAM CONTROL DEVICE FOR DOMESTIC APPLIANCES
Erich Scheer, Peterzell, Black Forest, Germany, assignor to Kieninger & Obergfell, St. Georgen, Black Forest, Germany
Filed July 21, 1966, Ser. No. 566,808
Int. Cl. H01h 43/12
U.S. Cl. 200—38                                                5 Claims

ABSTRACT OF THE DISCLOSURE

A program control device for machines comprising a program memory unit for at least one program for the automatic and coded actuation of electrical switching contacts, whereby the phases determined by the program may be automatically initiated and terminated simultaneously and/or successively, a correcting device combined with the program memory unit to actuate at least partly, the same contacts as the contact actuating slides of the program memory unit such that these switching contacts are arbitrarily actuable during and/or outside a program phase by means of special actuating members of the correcting device, independently of the part of the program in progress or to be initiated permanently or for a predetermined time, or remaining open or closed for a predetermined time, said program memory unit being characterized in that at least one program switching condition initiating or terminating a phase of the program is defined by respective states of the electrical switching contacts and is stored in the program memory unit comprising the program switching states of the individual programs in the form of a maximum program carrier.

---

The invention relates, as indicated, to a programming device for machines, and preferably for domestic appliances, such as, for example, washing machines or dish washing machines, comprising a programme memory unit for at least one, and preferably for several programmes, for the automatic, possibly coded switching on and off of electrical switching contacts, whereby the operating phases fixed by the programme or programmes may be initiated and terminated simultaneously and/or successively and automatically.

It is already known to construct a programme storing or memory unit for a programming device as a series of cam disc, located on a common programme control shaft, so that the cams open and close electrical contacts at certain times. It has already been proposed, for a programme control with several programmes, to use a selection switch, which reduces the number of switching contacts and provides a possibility of changing the position of the control shaft in accordance with the desired programme so that the position of the electrical scanning contact to be switch on and off by the cam discs may be changed according to the selected programme. In this construction, the selector switch has a rotary wiper, arranged movably on the cam disc shaft, relative to the set of scanning contacts of the electrical contacts, wherein at least as many contact positions are associated with the wiper as there are individual control actions to be performed, so that the wiper can be moved only in certain relative positions to the continuously rotating control member in its step-by-step position by means of the electromagnetic stepping unit, forming the driving unit, when its magnet is energized.

More particularly, the control part has a circular insulating disc equipped on both circular surfaces with a conducting layer or coating with concentrically arranged recesses or etched away portions, adapted to assume different positions relative to the set of control contacts during the rotation of the disc and defining the selected programmes for the working circuit switch.

These features have the object of reducing to a minimum the number of electrical switching contacts required and of reducing thereby, firstly, the dimensions of the programme controller and, secondly, of increasing the reliability of the programme selecting apparatus, in view of the known fact that a larger number of electrical contacts entails also a larger number of sources of errors.

The applicants have therefore already proposed to reduce the number of electrical contacts and therefore also of possible sources of breakdowns, by using a coding system, such as is known from teleprinter techniques, using a code translator known in this field of engineering.

However, in view of the fact that, with the technical development of programme control devices, the requirements of further possibilities of varying the control programmes also increases steadily, and the space available within the housing of the machines is very limited, the programme control apparatus must be adapted to the new technical requirements and especially its dimensions must be reduced to a minimum.

The invention has the object of providing a reliable programme control apparatus, characterized by smaller dimensions than was hitherto known, while comprising a larger number of possible selections.

The invention relates, more particularly, to a programme control appaartus for machines, and preferably for domenstic machines, such as, for example, washing machines or dish washing machines, with a programme memory for at least one programme and preferably for several programmes, for the automatic and possibly coded switching on and off of electrical contacts, whereby the operating phases defined by the programme or programmes may be initiated and terminated simultaneously and/or successively.

According to the invention, this object is realized in that the programme memory unit is combined with a correcting device, adapted to switch at least partly the same contacts as the contact actuating slide of the programme memory unit, in that way that these contacts may be switched, for example, held open or closed or being opened or closed permanently or for certain periods during and/or outside any programme phase, arbitrarily by means of special members of the correcting device, and independently of the programme phase in progress or to be started.

Preferably, the correcting device is operated by keys. According to a further embodiment of the invention, at least one or any programme condition initiating or terminating a phase of the programme is defined in the form of a switching combination by switching states of the electrical switching contacts, and is stored in the programme memory unit as the maximum programme comprising the programme switching conditions of the individual programmes. As will be explained in detail further below, conveniently four electrical contacts are used altogether.

For selecting desired switching combinations, a read-out is provided, tuned to the code of the programme memory, as known in the art.

According to a further feature of the invention, the electro-mechanical programme storage unit consists of disc-shaped sliders, the edges of which are perpendicular to the direction of movement and are equipped at coded intervals with notches, while coding pins arranged in the read-out are arranged perpendicularly to these rims and adapted to engage into these notches. Each such coding pin is arranged in a plunger resting each on a cam plate parallel to the cam plate shaft, and so arranged that the coding pins can be lowered and/or lifted by their plungers independently while the cam plate rotates. Conveniently, the sliders are arranged in the form of stacks. Preferably, the correcting device also consists of disc-shaped sliders assembled together with the stack of sliders of the programme memory, but adapted to be displaced separately and individually.

Preferably, the sliders are mounted on springs acting in the direction of the contact actuations and are affected by the spring pressure or tension in the inoperative position, in which their notches are not in engagement with the coding pins.

Preferably, the disc-shaped sliders are made of sufficiently rigid foils, for example of synthetic resin, and require a minimum of space.

The invention has the advantage that the contacts necessary to ensure the control of the programme need be provided only once and are actuated by moving a slider corresponding to the programme condition in accordance with the timing of this condition.

The invention will be further explained, by way of example, with reference to the accompanying drawing, in which.

Figure 5:
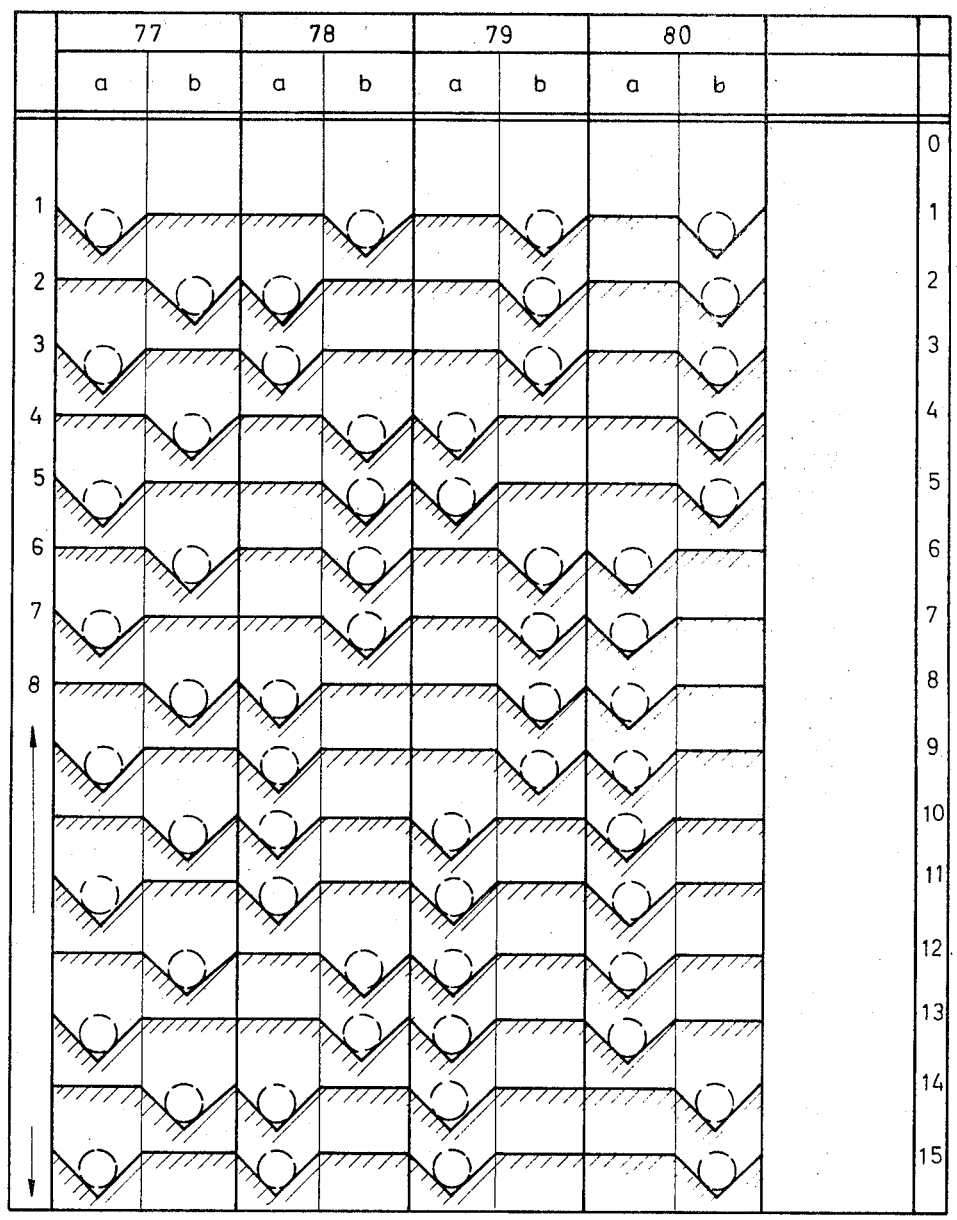
Figure 5A:
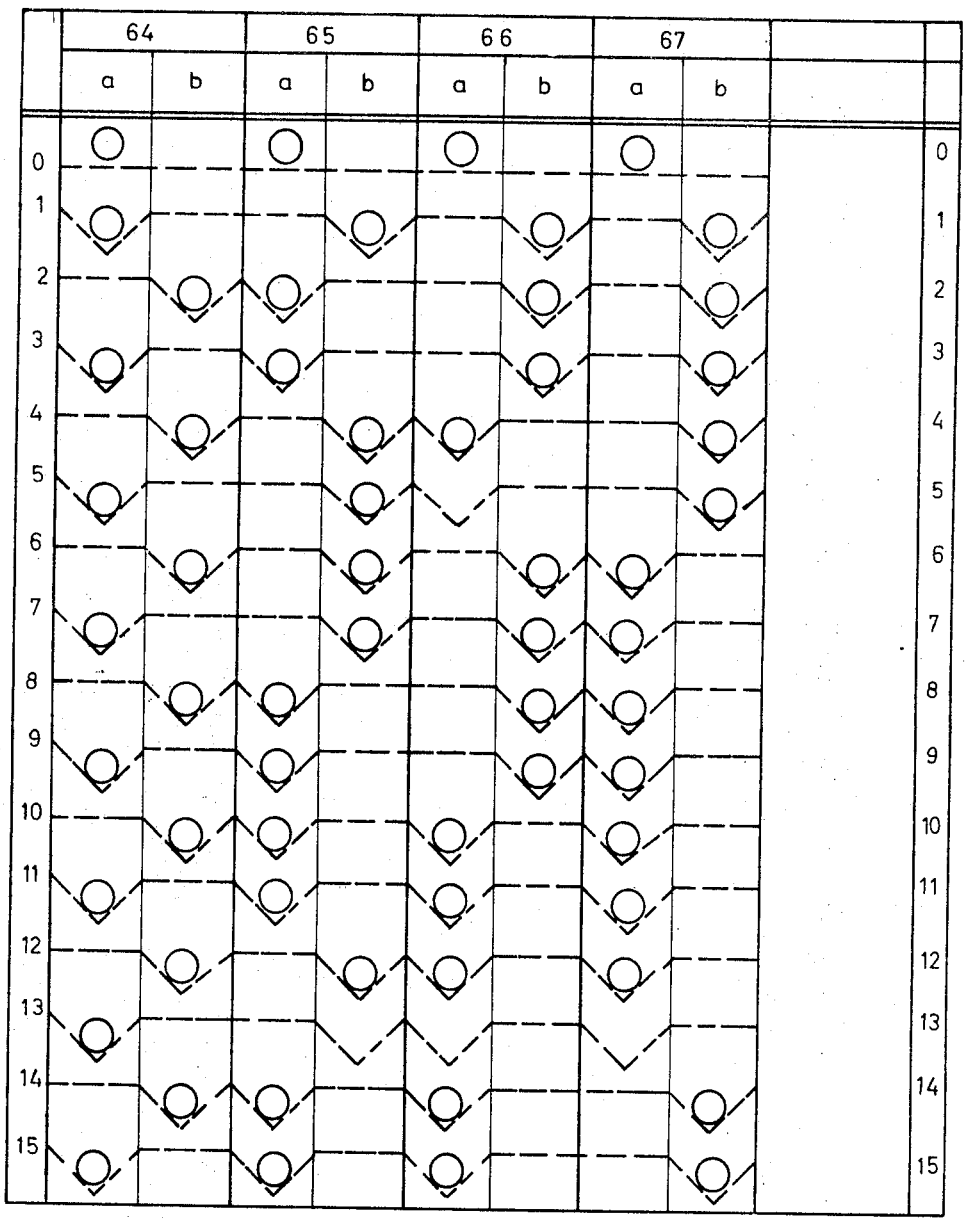
Figure 6:
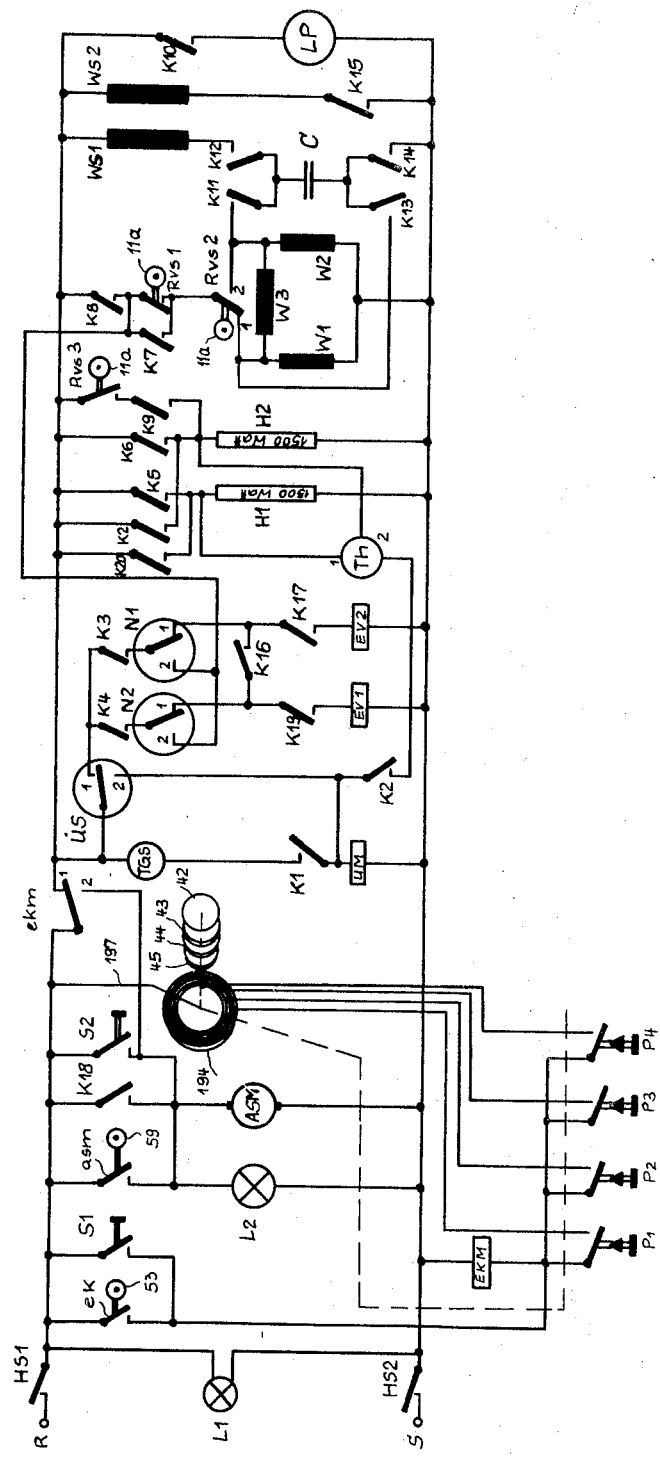
Figure 7:
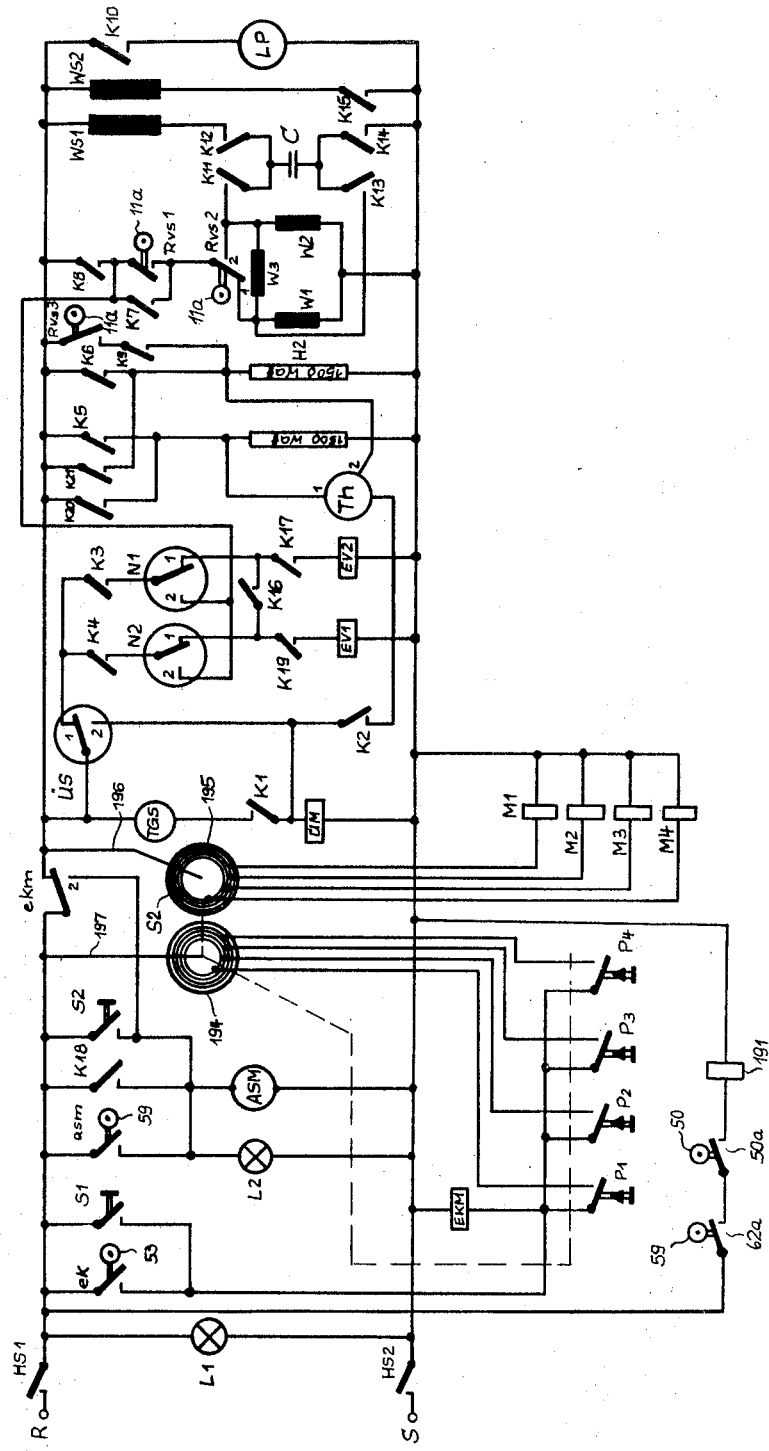

FIGS. 3a, 3b and 3c respectively show a preferred assembly of the programme control unit according to the invention in side elevation, plan and end elevation;

FIG. 4 shows an embodiment of the block diagram of the programme control unit according to the invention;

FIG. 5 and FIG. 5a show an embodiment of the code of the memory and the read-out of the control device according to the invention;

FIG. 6 is an embodiment of the circuit diagram of the programme control device according to the invention and FIG. 7 shows another embodiment of the circuit diagram of FIG. 6.

The construction of the gearing unit will first be described with reference to reference numerals 1 to 63 in FIG. 1.

Figure 1:
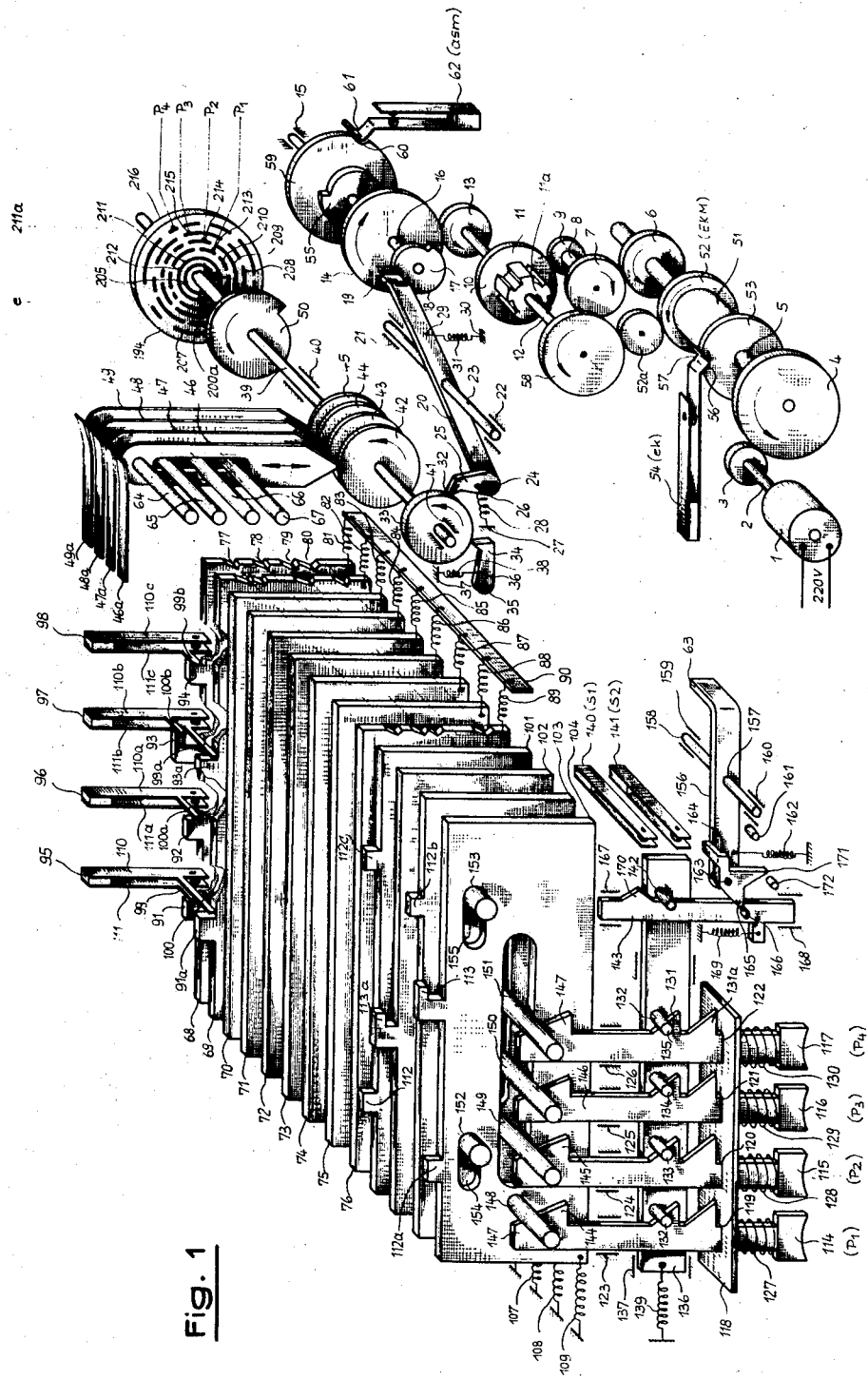
FIG. 1 shows an embodiment of the invention of a programme control device with mechanical stepping unit.

FIG. 1 shows a drive motor 1 (which may be a synchronous or asynchronous motor), the shaft 2 of which carries a pinion 3 which mates with a larger gear 4 arranged on a shaft 5 and forms therewith a reduction gearing. A gear 6 on the shaft 5 mates with a gear 7 whose rotation is transmitted via a shaft 8 to a gear 9 and thence to a gear 10 and through an overrun coupling 11 and a shaft 12 to a gear 13, and via a transmission at a ratio of preferably 1:1 to a gear 14, mounted on a shaft 16 located in a bearing 15, and carrying a cam disc 17; the periphery 18 of this cam disc 17 supports the dog 19 of a transmission lever 20.

The two-armed lever 20 is rotatably mounted on a shaft 23 located in bearings 21 and 22 and is affected by the bias of a spring 31, mounted at 29 and 30, causing the dog 19 of lever 20 to be pressed against the periphery of the cam disc 17. The said lever 20 forms with a ratchet 25, rotatably mounted at its other end in a bearing pin 24, a stepping unit, wherein the said ratchet 25 is affected by the action of a spring 28 fixed between the points 27 and 26, causing a point 32 of the ratchet to engage into the teeth of a stop gear 33 and advance the same during one step of the lever 20 through one or more divisions. A further ratchet 34 is rotatably mounted in a bearing 35 and is urged towards the periphery of the stop gear 33 by a spring 38 tensioned between the attachment points 36 and 37. Ratchet 34 serves to secure the position of the stop gear 33 during the return movement or during the forward movement of the ratchet 25 of the lever 20.

The stop gear 33 is mounted on a shaft 39 which is located in bearings 40 and 41 and carries, in addition to the said stop gear 33, cam discs 42, 43, 44 and 45 which carry plungers 46, 47, 48 and 49. These plungers 46 to 49 are displaceably mounted in guides, not shown, in the direction indicated by the arrows, in alignment with the profiles of the cam discs 42 to 45.

The movements of the plungers 46 to 49 are limited by two end positions and have different dimensions according to the programme phase, wherein the amplitude of the displacement of the individual plungers follows a code, shown in FIGS. 6 and 6a. Leaf springs 46a to 49a bias the plungers 46 to 49 towards the peripheral profiles of the cam discs 42 to 45. Reference numeral 51 indicates a coupling gearing mounted on the shaft 5 and rotating a gear 52 and a cam disc 53 on which rests the end of resilient spring 57 of a set of contact springs 54, the object of which during the actuation of the programme control and after the programmed interruptions during the course of the programme will be described later. The cam disc 53 is firmly connected with the coupling 51 and may rotate therewith. One point of the periphery of the cam disc 53 has a notch 56 into which engages spring 57 of the set of contact springs 54 when the coupling 51 is in a certain position. The gear 52 is rotated by the shaft 5 only during certain phases of the programme; this drive is transmitted by the coupling 51 which transmits the rotational movement of the shaft 5 to a gear 58 connected with the shaft 12 which extends parallel to the shaft 5. In order to achieve the required sense of rotation, an intermediate gear 52a is mounted between the gears 52 and 58.

The shaft 12 also carries an overrun coupling 11 which has the object of making possible a fast rotation of the shaft 12 through the coupling 51 and the pair of gears 52, 58. This overrun clutch may comprise a simple stop gearing, and it has the object of equalizing the difference in the speeds between the shafts 12 and 7 in the case of a fast adjustment of the shaft 12. The fast adjustment or turning of the shaft 12 via the coupling 51 and the overrun coupling 11 has the object of "overrunning" and thereby eliminating certain phases of the programme, the so-called elimination phases, to be explained further below, by quickly rotating the shaft 16. During this, also the stepping unit 20 to 25 must effect the fast rotation of the stop gear 33 and an equally fast change in the operating states of the plungers 46 to 49.

Cam discs 11a arranged on the overrun coupling 11 serve for the reversing control of the washing machine and for actuating other processes independently of the programme control. Thus, the overrun coupling 11 may carry, for example, the contacts shown in FIGS. 6 and 7 at Rvs 2 and Rvs 3, with the associated cam discs.

The shaft 16 carries a cam disc 59, firmly attached thereto and having a notch 60 into which engages the actuating member of the set of contact springs 62, when the cam disc 59 is in a certain position.

The function of the said cam disc 59 and of the set of contact springs 62 corresponds substantially to the function of the cam disc 53 and set of contact springs 54, as will become apparent from the ensuing description of the circuitry.

FIG. 4 shows again diagrammatically an overall diagram of the construction so far described. An asynchronous motor ASM, shown in FIG. 1 at 1, serves for driving the reduction gearing 3, 4. The reduction gearing 3, 4 transmits its rotational motion to the stepping unit 20 at 25 on the one hand, and to the cam disc 11a, serving as reversing unit, on the other hand, and arranged in the embodiment shown on the overrun coupling 11. Parallel to the reduction gearing is the coupling gearing 51, acting as an eliminating coupling, becoming effective when a new programme phase is initiated by the contact actuating slides and transmitting an accelerated rotational movement to the stepping unit 20 to 25. The stepping unit acts on the control mechanism, described in the following, and actuates also an eliminating switch 194, causing in its turn the actuation of the eliminating coupling 51 located parallel to the reduction gearing 3, 4 (FIG. 1). The said eliminating coupling 51 is also associated with a reversing contact *ekm*, the function of which will be explained later (see FIGS. 7 and 8).

The gearing arrangement shown in FIG. 1 must be regarded only as one of the many possible embodiments of a mechanical drive of the programming unit. The embodiment of FIG. 1 has the advantage of making possible the sudden, jerk-like advance of the plungers 46 to 49 and the sudden switching of the associated contacts, while at the same time, during normal operation the continuous drive of the stepping unit through the gearing members of the reduction gearing is possible, and a coupling between moving parts is required only in the case, where a phase is to be eliminated.

The operation of the arrangement shown in FIG. 1 is as follows:

The cam disc 50 arranged on the shaft 39 and the cam disc 55 arranged on the shaft 16 actuate a lever 63 which serves to initiate mechanically the keys switching on the programme control device and the programme selection at the end of the programme.

The plungers 46 to 49 operable by the cam discs 42 to 45 each carry a coding pin 64, 65, 66 and 67 which extends through slots of the plungers uniformly to a slide 76.

As indicated by the dash-dot lines, the coding pins 64 to 67 rest on the vertical edges of plate-shaped slides 68 to 76, in accordance with the coding plan shown in FIGS. 6 and 6a. Preferably, the vertical edges of these slides have triangular notches, shown, for the sake of clarity only on the edges of the first two slides 68 and 69 and the last slide 76, as at 77, 78, 79 and 80. The slides 68 to 76 may be displaced longitudinally against the action of tension springs 81 to 89, mounted in a holding rail 90. Each slide 68 to 76 is associated with a certain position of the electrical contacts of the programme control and represents therefore a certain programme condition.

The apparatus has the object of changing the programme condition by moving individual slides in accordance with a predetermined programme. This object is realized in that the coding pins 64 to 67 are moved together with the plungers 46 to 48 during the lifting and lowering thereof, the movements being differential in accordance with the cam discs 42 to 45 which cause the step by step movements of the plungers 46 to 48 via the ratchet 25. According to the relative positioning of the coding pins following this movement, the pins 64 to 67 fit into the notches of one or more slides 68 to 76. These slides are pulled out by the action of the associated tension springs 81 to 89 until their notches 77 to 80 make contact with the coding pins 64 to 67. Simultaneously, contact operating cams located on the upper surfaces of the withdrawn slides 68 to 76 actuated electrical contacts 95 to 98, which are common to all slides.

In the embodiment as shown in the drawing, only the coding pins 64 to 66 fit into the notches 77, 78, 79 of the plate 68, whereas the pin 67 does not fit into the notch 80, so that this plate is not withdrawn in the programme phase shown in the drawing.

In order to illustrate the operating principle, the arrangement of the slides 68 to 76 is shown in perspective in FIG. 1, and a substantial space remains between the individual slides. In the practical embodiment, however, the individual operating slides may be immediately adjacent to each other to form a stack of minimum height. These slides may be made of insulating foil or sheets of thicknesses amounting to several tenths of a millimetre.

Figure 2:
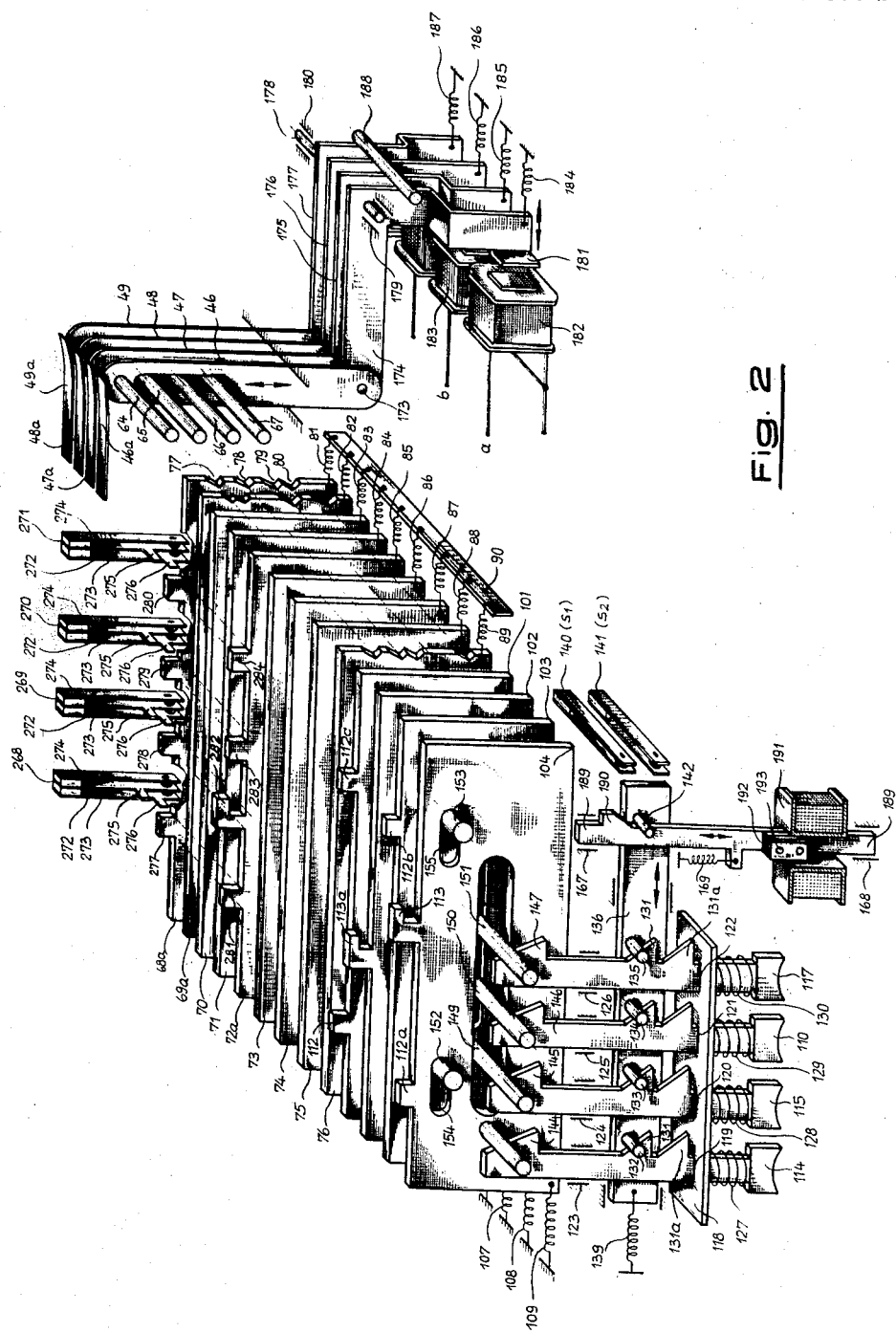
FIG. 2 shows a further embodiment of the programme control device according to the invention, incorporating a a relay operation.

The sets of contact springs 95 to 98 have actuating springs 99 to 99b and 100 to 100b, arranged perpendicularly to the stack of slides 68 to 76 and project beyond the same. For the sake of clarity, the actuating springs in FIGS. 1 and 2 are not shown over the entire stack of slides, but are only shown in part; the four sets of contact springs 95 to 98 in FIG. 1 are given merely by way of example, and the number of contacts may be substantially larger. For each operated slide, i.e., for each slide engaged by the actuating pins, a certain number is actuated of this maximum number of contacts. The number of type of actuated contacts is governed by the type of programme to be performed. By means of the slides 68 to 76, the contacts 95 to 98 may be operated in arbitrary combination and several actuating contact slides may engage with the coding pins for any given programme condition.

It depends, therefore, on the lift of the plungers 46 to 49 whether one plate, and which plate or which plurality of plates is withdrawn by the tension springs 81 to 89 from the stack 68 to 76 and is pressed with the notches in its vertical edge on to the coding pins 64 to 67, while simultaneously the previously withdrawn plate or plates is/or are pushed back into the stack by the coding pins 64 to 67 against the action of the springs 81 to 89 (see FIGS. 5 and 5a).

In the FIG. 1 embodiment, two end positions are provided for each plunger, determining at the same time two level positions for the coding pins 64 to 67. Each combination of these positions can be used for defining one position of the sets of contact springs 95 to 98. If further positions are provided, for example three positions, one obtains a corresponding increase in the switching positions, combined with a larger number of notches 77 to 80 on the slide edges.

According to the laws governing combinations, the number of positions which may be assumed by the plungers 46 to 49, and thus also the number of possible states is:

$$Z = P^n$$

in which P is the number of the positions into which the adjusting members may be moved and $n$ is the number of available adjusting members.

For the present case of a programme control according to FIG. 1 with two possible positions of the adjusting members 46 to 48 and four adjusting members, the number of possible switching states is: $Z = P^n = 2^4 = 16$. Accordingly, the actuating device of FIG. 1, represented by the levers 46 to 49 and the contact actuating pins 64 to 67, may assume sixteen different positions, of which one is eliminated as being the inoperative position. Thus, the number of effective and usable contact positions is in this case $Z' = P^n 1 = 2^4 - 1 = 15$.

As will become apparent from the following description of the switching states to be supplied by the programme control, fifteen contact positions is generally sufficient for performing an average programme of an automatically controlled washing or dish washing machine. For example, if in the FIG. 1 embodiment three positions were provided for each plunger, the number of possible usable contact positions would be $$Z' = P^n - 1 = 3^4 - 1 = 80$$

i.e., a number which exceeds by far the maximum number of contact positions which occur when performing an average programme.

Thus, for an average programme, generally the use of three to four plungers with associated coding pins and always two possible positions is perfectly sufficient.

In FIGS. 5 and 5a, the notches 77 to 80 in the vertical edges of the contact actuating slides 68 to 76 are shown on an enlarged scale, so that during their engagement with the coding pins 64 to 67, they cover the latter just sufficiently to assure that they are returned reliably to the stack of slides during the subsequent vertical movement of the interengaging plungers 46 to 49. This is an essential advantage of the present invention, because special resetting members for returning the withdrawn slides are eliminated and the resetting is effected simultaneously and automatically with the positional change of the plungers 46 to 49.

The invention further comprises, in addition to the contact actuating slides automatically actuating the contacts 95 to 98 as a function of the plungers 46 to 49 and the cam discs 42 to 45, further slides 101 to 104, arranged together with the slides 68 to 76 in one stack and operating, at least partly, the same contacts 95 to 98.

As already mentioned, it is known to select the programme in programme control devices, either by eliminating from a maximum programme those portions which are not required for a given programme, or by operating certain contacts which characterize the selected programme, i.e., opening or closing these contacts. In the present case, this may be effected in that special eliminating contacts are provided which are actuated exclusively by the so-called programme selector slides 101 to 104, or—as in according to the invention—the programme selector slides 101 to 104 affect contacts, actuated in themselves by the contact actuating slides 68 to 76 so that they remain permanently open or closed or are subject to a permanent interruption. In the embodiment of the programme control of FIG. 1 this is achieved in that the operating contacts of the programme control device 95 to 98 have actuating springs 99 to 99b and 100 to 100b, differing both in position and in length. The programme selector slides 101 to 104 carry actuating cams 112 and 113, corresponding substantially to the actuating cams associated with the contact actuating slides 68 to 76 and so arranged that they may make contact with the actuating springs 100 nd 100b, extending deeper into the stack, so that, when the programme selector slide is deflected to the right, that is against the force of the springs 107, 108 and 109, the springs 110 to 110c of the sets 95 to 98 can be partly bent out, because the actuating cams of the programme selector slide make contact with the actuating springs and, with penetration of one of the contact actuating slides 68 to 76 the actuation of one or several of the contacts 95 to 98 is no longer possible, although the actuating cams of the contact actuating slide are in contact with the actuating springs of the contacts, because the springs 110 have been bent out too far by the programme selector slide 101 to 104.

Similarly, the actuating springs 99 may also be so designed that they cooperate with the actuating cams of the programme selector slide in such a way that with the operation of one of the programme selector slides 101 to 104 contacts are affected by a continuous actuation by being shifted to the right under the action of the actuating cams of the progarmme selector slides. Thus it would be possible to hold one or more of the programme control contacts 95 to 98 in the closed position, even if none of the actuating cams 91 to 94 on the contact actuating slides 68 to 76 engages the associated set of contact springs 95 to 98. If one of these contacts, equiped with a correspondingly longer actuating spring 99, enabling it to be operated also by the cam of the programme selector slide 102 to 104, is to be able by selecting a certain programme slide, to prevent its actuation, one or more actuating cams must be provided, corresponding to the actuating cam 113 provided on the programme selector slide 103, and acting so that, in the case of a movement towards the right, they can actuate the actuating springs 110 of the associated contacts, while not engaging the actuating springs 99 to 99b mounted on the spring 111. These processes will now be explained in detail as follows:

The actuating spring 99 mounted on the contact 95 protrudes beyond the stack of contact actuating slides formed by the slides 68 to 76. Thus, the spring 99 is actuated by cams 91, 91a, arranged on the contact actuating slides 68–76 or by further actuating cams 91b, mounted on the other sides and having the identical position to the cams 91, by pushing to the right one or more contact actuating slides 68–76, together with the contacts spring 111, causing the contact 95 to close. The actuating spring 99 is actuated only by the contact actuating slides, while the programme selector slides 101 to 104 do not affect this actuating spring 99.

The contact spring 100, however, of the contact 95, overlies both groups of slides, i.e., both the contacts actuating slides 68 to 76 and the programme selector slides 101 to 104. Actuating cams 112, 112a, mounted on the programme selector slides 101 to 104 and possibly further, identical actuating cams 112, etc., cause a displacement of the contact spring 110 connected with the actuating spring 100 during the actuation of a corresponding programme selector slide so that the contact 95 can no longer be closed when the spring 111 is actuated through the cam 91, etc., on the contact actuating slides 68 to 76.

On the other hand, it would also be possible, by so extending the actuating spring 99 that the same overlies both the stack of contact actuating slides and the stack of programme selector slides, to shift the contact spring 111, by means of cams mounted on the programme selector slides, so that the contact 95 remains permanently closed and opens only at the end of the programme when the associated programme selector slide is released. However, here it is possible only to carry out one or the other actuation by the programme selector slide, according to which of the two actuating springs has the appropriate length.

However, if the permanent closure and permanent opening of the contact is to be effected at will by operating different programme selector slides, an arrangement must be used, as shown in conjunction with contact 97. There, the contact actuating springs 99a and 100a are mounted at different heights on the associated contact springs 111b and 110b.

Both contact springs project both beyond the contact actuating slides 68 to 76 and beyond the programme selector slides 101 to 104 over their entire height.

If the contact 97 is to be closed permanently, the associated programme selector slides may be provided with actuating cams as at 112 to 112c in FIG. 1 which, when the associated programme selector slide is operated or moved, cause the closure of the contact 97 through the actuating spring 99a and the contact spring 111b.

If, on the other hand, the contact 97 is to be held open continuously, the associated programme selector slide is provided with a hook-shaped actuating cam 113 or 113b so that during a movement towards the right, i.e., during the actuation of the programme selector slide, the actuating spring 100b is operated, causing the contact 97 to be held open by bending the spring 110b, while the actuating spring 99a is not engaged.

The contact spring set 97 is associated with an actuating cam 93 on the contact actuating slide 68, formed similarly to the actuating cams 113 and 113a associated with the programme selector slides 101 to 104, and which may be used, for example, for opening a permanently closed rest contact by means of a contact actuating slide, while affording simultaneously the possibility of preventing this opening action by programme selector slides to be operated.

This hook-shaped actuatnig cam 93 overlies the actuating springs 99a and actuates the actuating spring 100b, causing the spring 110b to bend so that the set of springs 97 is opened. This opening action may be prevented by programme selector slides acting on the actuating spring 99a, whereby the set of contact springs is deflected in the closed position.

The set of contact springs 96 forms a simple rest contact adapted to be opened temporarily by the contact actuating slides 68 to 76, and, where required, permanently by the programme selector slides. The actuation is effected by the actuating spring 100a which deflects the spring 110a and thereby opens the contact. If required, the spring 100a can be so extended as to overlie all or a part of the programme selector slides and be adapted to be affected thereby.

The contact 98 is a simple working contact adapted to be closed temporarily by the actuating cam 94 or, with a suitably formed actuating spring 99b, permanently by the programme selector slides.

It is apparent from the foregoing description that the proposed arangement, and particularly the arrangement of programme selector slides and contact actuating slides together in one stack and the joint actuation of contacts 95 to 98 associated with both, result in simplifications and savings in the construction of programme controls.

The actuation of the individual programme selector slides 101 to 104 is effected by associated keys 114 to 117, corresponding to the references P1 to P4 in the attached circuit diagrams. These keys 114 to 117 are located in slots 119 to 122 in a front plate 118 and are guided on the other side in bearings 123 to 126. Springs 127 to 130 act in the direction opposite to that of the operating keys 114 to 117 so that a depressed key is always affected by the bias of its return spring. The keys 114 to 117 act on pins 132 to 135 which are laterally displaced by the stop lug 131 provided on each key and transmit this lateral displacement to the associated slide 136, mounted in support guides 137 and 138. In the end position of the keys 114 to 117, the maximum movement of the slide 136, affected by the force of a return spring 139, a contact arrangement comprising contacts 140 and 141 is operated (these contacts correspond to contacts S1 and S2 in the circuit diagrams). In addition to the stop lug 131, each key 114 to 117 has a further lug 131a, making possible the displacement of the slide 136 even in the engaged position of the keys 114 to 117, by pushing the same further inwards, so that the contacts S1 and S2 can be actuated. This maximum operation initiates on the one hand the programme control, and continues, on the other hand the programme after the predetermined programme interruptions.

If one of the keys 114 to 117 is operated, the lug 131 of the key shifts the slide 136 via the pins 132 to 135 to the right, until the point of the lug passes beyond the pins 132 to 135, whereupon the slide 136 returns under the action of its return spring to its starting position, caused by the pin 142 coming to rest against the trigger slide 143.

At the same time, the engagement between the lug 131 and the pin 132 to 135 blocks one of the keys 114 to 117 so that it returns into the inoperative position only on the operation of another key. In the blocking position of the keys 114 to 115, the contacts 140 and 141 (corresponding to contacts S1 and S2 in the circuit diagrams) are no longer actuated. By longitudinally displacing one of the keys 114 to 117, the ends 144 to 147 of the keys move via the associated actuating pins 148 to 151 one or more of the programme selector slides 101 to 104 towards the right so that the actuating cams 112, 113, etc. of the programme selector slides move the contacts 95 to 98 into the positions preparatory for the selected stage of the programme. The programme selector slides 101 to 104 are mounted in the same way as the contact actuating slides 68 to 76 of pins 152 and 153 and are adapted to be longitudinally displaced in slotted guides 154 and 155.

In principle, the programme selector slides can be actuated directly, i.e., by providing the programme selector slides 101, 102, 103 and 104 with appropriate key lugs or noses, enabling the programme selector slide to be actuated directly. This construction is shown in the programme control device illustrated in FIG. 3, where the programme selector slides are directly equipped with key lugs for operating the programme selection.

When the programme is terminated, the end 63 of the lever 156, mounted at 157 on the shaft 158 and supports 159, is disengaged from the cam 55 and returns to the stop pin 161 under the action of a spring 162. During the downward movement of the lever 156, the ratchet 164 mounted at its front at 163 engages with its point 165 the flat 166 of the lever 143, mounted displaceably between supports 167 and 168. The lever 143 is affected by the force of a return spring 169 under the action of which it impinges on an end stop formed by the support 167. During the downward movement of the ratchet 164, the point 165 of the ratchet moves the flat 166 against the force of the return spring 169, while the lug 170 of the lever 143 moves the pin 142 so in the actuating sense of the slide 136 that the pins 132 to 135 come into the operating range of the points of the lugs 131 and return then, under the action of the return springs 127 to 130 and under the radial pressure of the pins 132 to 135, to their initial position.

During the sliding off of the lever 156, the point 171 of the ratchet 164 impinges on the pin 172 and is so deflected that it becomes disengaged from the flat 166, causing the lever 143 to reutrn to its starting position under the action of the return spring 169. Owing to the simultaneous return of all keys 114 to 117 into their starting positions, the appliance to be controlled by the programme control device has been de-energized and the programme switching is terminated. The collaboration of the two cams 55 and 50 during the switching off has the object of defining the position of the cam disc 59 on the shaft 16 so that the whole appliance can be switched off only after the contact 62 has been de-energized by the engagement of the actuating spring 61 in the gap 60.

The construction of the programme control device according to FIG. 2, showing a special modification of the invention, corresponds substantially to that of FIG. 1, with the difference that the actuation of the plungers and coding pins is not effected as a function of the movement of a camshaft, but by means of a magnetic control. In addition, the contact arrangement differs from that of FIG. 1, in a manner described further below.

The plungers 46 to 49, carrying also in this embodiment the associated coding pins 64 to 67, are mounted with their lower ends as at 173 on associated crank levers 174 to 177 and are individually movable; the crank levers 174 to 177 are rotatably mounted on a shaft 178, located in bearings 179 to 180. At their lower ends, the levers 174 to 177 have angled anchoring portions 181 which are affected by associated magnets 182, 183, and two further magnets not marked with reference numerals in the drawing. The said levers 174 to 177 are affected by the force of return springs 184 to 187, tending to pull the levers 174 to 177 against an abutment shaft 188. During the run of the programme, the associated magnets 182 and 183, and the two further magnets, not marked with reference numerals, are energized according to a combination sequence, for example so that the armature 181 of the lever 174 is attracted. The pivotal movement of the lever 174 about its pivot 178, causes the plunger 46 to be longitudinally displaced, carrying along the coding pin 64. Thus, as in FIGS. 1 and 2, a variation of the two end positions of the levers 46 to 49 is used for actuating the associated contact actuating slides, or returning them to the stack. The difference is merely that the actuation of the levers 46 to 49 is not effected by means of a cam arrangement but by a combination actuated magnetic arrangement, energized and actuated by devices described with reference to the circuit shown in FIG. 7.

The actuating device according to FIG. 2 is suitable especially where, for one reason or another, the stack of slides must be separated from the remaining programme running mechanism, providing a simple arrangement for mounting the control mechanism, i.e., the actuating mechanism with the stack of slides, separately and to affect this arrangement electrically from the remotely mounted running mechanism. This arrangement has the further advantage of providing simple facilities for forming units which can be electrically assembled and afford great adaptation to different connecting requirements.

Figure 2A:
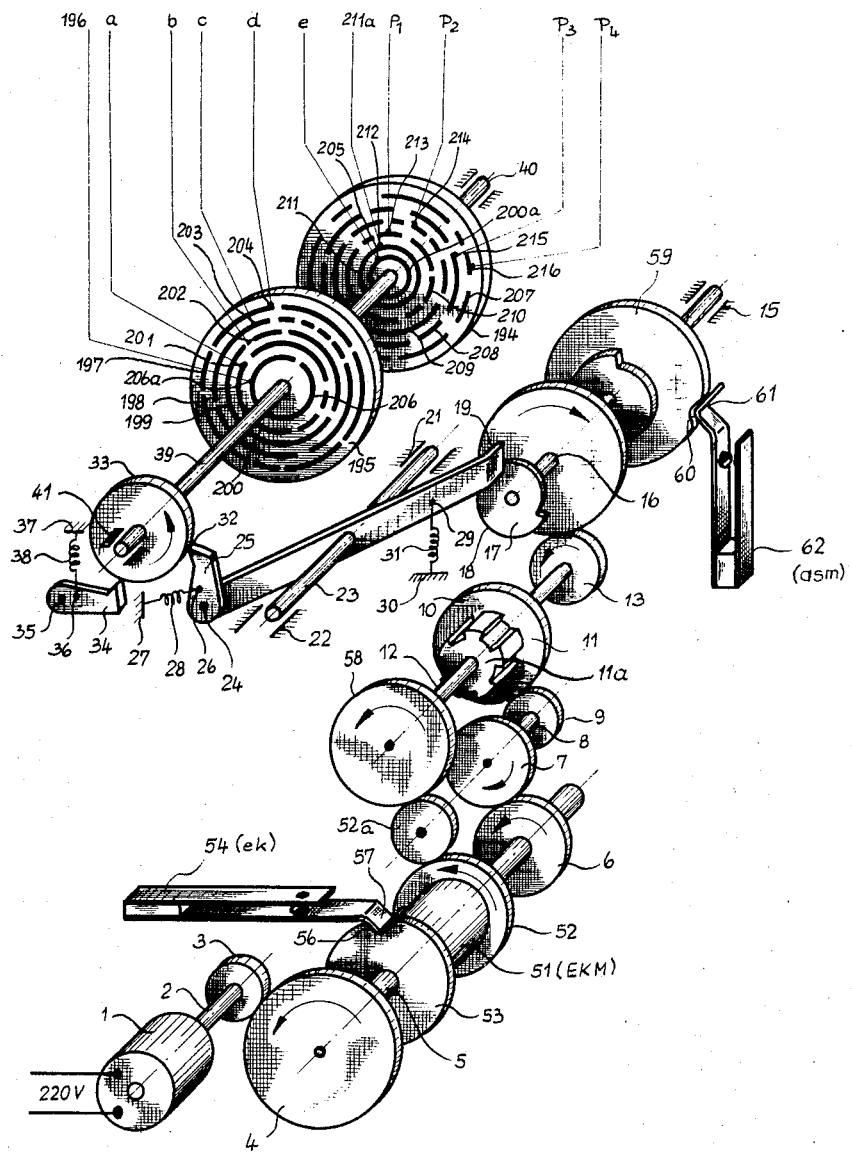
FIG. 2a shows an embodiment of the actuating gearing of the programme control of FIG. 2.

The running mechanism of the programme control of FIG. 2 is shown in FIG. 2a. It differs from the FIG. 1 arrangement in that the cam discs 42–45 are replaced by a contact plate 195, forming a selector switch and carrying preferably a printed copper circuit 197, 198, 199 and 200 connected by brushes 201 to 204 to leads *a, b, c* and *d*.

The leads *a, b, c, d* are connected directly to the magnets 182, 183, etc., which operate the actuating device (see FIG. 2).

The control current is applied to the paths of the plate 195 through the path 206, the feed 196 and the associated brush 206*a*.

The shaft 39 carries a further plate 194, also carrying a printed circuit with paths 207 to 211, associated with brushes 212 to 216. Here, too, the current is applied via a path 211, a feed 211*a* and a brush 212.

A similar plate is also mounted on the shaft 39 of the drive mechanism in FIG. 1 and causes there the elimination of those parts of the programme which are not required in a special sequence, as will be described further below.

The said plate or disc 194 is a so-called elimination selector, i.e., each track is preferably associated with one programme (as shown in the circuit diagrams in FIGS. 6 and 7) and this programme is activated by depressing the programme selector keys P1 to P4, or 114 to 117, respectively, through the contacts associated with the programme selector slides. The individual paths or tracks 207 to 210 carry a so-called maximum programme of the eliminations corresponding to the programmes P1 to P4 to be selected so that this disc 194 applies the so-called elimination criteria during the run of the programme.

According to another solution, the individual paths of the disc 194 are not associated with the whole elimination programme of the selected programme, but each path fulfils the function of eliminating one programme phase and according to the choice of the programmes P1 to P4 the required tracks are combined and become effective in this manner.

The most advantageous circuitry of the elimination selector will result from the programme conditions. In the circuit diagrams in FIGS. 6 and 7, there are described only programme eliminations, in which each path on the disc 194 is always associated with a closed elimination programme.

The disc 194 carries, in addition to four tracks 207 to 210 for selecting the programmes by means of the keys P1 to P4, or 114 to 117, a further track 200*a*, connected by a brush 205 to a lead *e*. This further track 200*a* serves for the "new selection," not yet described in conjunction with the programme selection arrangement of FIG. 1. This track *e* is associated with a further programme selection key, not shown in FIGS. 1 and 2, and serving for returning an already started programme quickly to the starting point in order to replace it by a newly selected programme, i.e., this programme is quickly eliminated by depressing the Reselector key. This track 200*a* of the lead *e* defines an elimination phase which is interrupted when the programme switching means have returned to their starting point. Once this has happened, a new programme can be initiated by depressing the appropriate key.

FIG. 2 differs from FIG. 1 especially in the construction of the release mechanism. Instead of the mechanical release mechanism with keys 114 to 117, the arrangement of FIG. 2 is electrically operated by means of relays.

In FIG. 2, there is provided a separate release slide 189 for releasing the keys 114 to 117; this slide is longitudinally movable in support guides 167 and 168. It is urged by a spring against an abutment, formed by the guide support 167 and the lug 190 of the release slide 189. The release slide 189 carries at its lower end an armature 192, mounted thereon by screws or rivet 193 and extending into a coil 191. When the programme is terminated, the coil is energized for a brief period, causing the armature slide 189 to be moved briefly against the force of the spring 169, releasing through the pin 142 the retaining slide 136 and causing thereby the resetting of the keys 114 to 117. The brief energization of the magnet may be effected, for example, in that the set of springs 62, actuated by the disc 59 located on the shaft 16, is associated with a further contact 62*a* (not shown in FIG. 2), which is closed at the moment when the actuating spring 61 engages into the gap 60 on the cam disc 59, and which is connected in series with a programme contact 55*a*, which is closed when the control device reaches its end position. This latter contact 55*a* (also not shown in FIG. 2) may be mounted, for example, on one of the discs 194 or 195 (FIG. 2*a*). (The circuit diagram in FIG. 7 shows the arrangement of these circuit elements.)

When a second contact, associated with the set of springs 62, is closed, a circuit is closed at the moment when the programme is terminated, causing the magnet 191 to be energized so that one of the preselected programming keys 114 to 117 returns into the inoperative position. At the same time, the main contacts HS1 and HS2 in FIGS. 8 and 7, respectively, are opened, the magnet is de-energized and returns into its starting position. During the re-starting or re-selection of a programme, the magnet 191 responds again, but since in selecting a new programme, the programme selector key is pushed for a brief period and during this time the notch 60 on the cam disc 5 passes under the actuating spring 61, the associated contact is opened and the existing circuit of the magnet 191 is broken until the selected programme is terminated.

FIGS. 3*a*, 3*b* and 3*c* show the programme control device according to the invention in an embodiment adapted to practical conditions.

A housing 217 contains the programme selector slides 218 to 221, forming a comparatively thin, layered stack, with the contact actuating slides 22 being arranged parallel thereto. Both types of slides, the contact actuating slides and the programme selector slides are U-shaped, and the latter have at their front ends direct connecting links with the programme selector keys 223 to 226. Thus, by operating the associated programme selector key 223 to 226 the appropriate programme selector slide is directly actuated, i.e., shifted. The means for blocking the depressed key are not shown in the drawing in FIGS. 3*a*, 3*b* and 3*c*, and are of the same nature as described in conjunction with FIGS. 1 and 2.

The contact actuating slides are operated by plungers 227 to 230, equipped with coding pins 231 to 234. The actuating slides 227 to 230 have a lateral lug 235 with a suitably formed point 236 which co-operates with the cam disc 237 to 240 associated with the actuating member. A ratchet wheel 241 is associated with the cam discs 237 to 240, and co-operates with a ratchet, adapted to move to and fro on a pivotable lever 234 mounted at 244. The lever 243 has, on its other end, a roller 245 running on a cam disc 246 driven at a predetermined timing continuously through the gearing 247, 248 and possibly through further transmission members from the motor 249.

The cam disc 246 associated with a wheel 250 which is firmly connected to the cam disc. The contact slides 222 and the programme selector slides 218 to 221 are guided inside the housing 272 along the edges 251, 252 and 253, and are freely movable in the housing 217 both in the actuating direction of the programme selector keys and the contact actuating slides. The edge 254 has, in the U-shaped recessed portion of the programme selector slides or contact actuating slides, recesses or cams (similar to those shown in FIGS. 1 and 2) which cooperate with contact 255 to 260 arranged within the U-shaped recesses of the programme selector and contact actuating slides. One edge and the cover of the housing 217 are equipped with plug-in sockets 261.

The programme control device in FIGS. 3*a*, 3*b* and 3*c* is a simple apparatus which does not comprise any elimination of programme phases or the like. The programme is selected only by actuating programme selector keys, causing associated contacts to be actuated or their actuation to be prevented, to enable a selection between the various programmes of the programme control device to be effected.

The operation of the apparatus of FIGS. 3a, 3b and 3c is as follows: operation of one of the keys 223 to 236 causes the programme control to be switched on; a motor 249 starts and transmits a rotational movement through a gearing 247, 248 and 250 to the cam disc 246, whose roller 245 deflects the lever 243 which is pivoted on its pivot 244 and advances during its reciprocating movement by means of the associated ratchet 242, the ratchet gear 241 through one or more teeth.

The cam discs 237 to 240 are firmly connected with the ratchet gear 241 and co-operate through lugs or cams 235 with the operating point 236 of the associated plungers 227 to 230. In this way the plungers 227 to 230 with their coding pins 231 to 234 are longitudinally displaced, for example according to the code shown in FIGS. 6 and 6a. The coding pins 231 to 234 co-operate with notches 262 to 265 in the contact actuating slide 222, so that, with every positional change of the actuating device, a new contact actuating slide is positioned over the coding pins 231 to 234 and the slide hitherto pushed out of the stack of contact actuating slides 222 is pushed back into the stack.

The movement of the contact actuating slide causes the actuation of contacts 255 to 260 in the housing 270 to be changed by means of actuating cams provided along one edge 254.

At the termination of the programme, means not shown and corresponding to those of FIGS. 1 and 2, release the actuated programme selector slide which returns under the action of return springs into its starting position, while the working appliance associated with the programme control is simultaneously switched off.

FIGS. 3a, 3b and 3c show that the invention makes it possible to provide a simple and very compact programme control, forming a combination between a programme control apparatus and a selector switch, using for both actuating members at least partly the same contacts, so that the amount of contacts is reduced to a minimum.

FIGS. 3a, 3b and 3c show also a simple device making possible, according to the invention, the easy and cheap indication of the programme stage in association with the programme control.

The programme selector keys 233 to 236 are simply marked with inscriptions indicating the associated programme. Underneath the programme selector keys there is a window 262 with an indicator 263 above the window. Behind the window 262 passes a tape running over two rollers 265 and 266, which moves as a function of the progress of the programme and indicates to the operator the programme stage which is just being performed.

The tape is so actuated that the programme indicator forms with the selector switch and the actuating means for the contacts, e.g. the contact slides, one structural unit adapted to be arranged with its front side 267 directly on the front side of the working machine, so that a simple closed structural unit is formed for the assemblies which have hitherto always been separate, namely the selector switch, the indicator of the programme phase, and the programme control. The advantages of a programme control according to FIGS. 1, 2, 3a, 3b and 3c are considerable since, for example, wiring between the programme selector switch and the programme control is no longer necessary, and the actuating members use the same contact equipment. The programme control according to the invention and particularly the embodiment of FIGS. 3a, 3b and 3c represents a considerable improvement in the simplicity of its construction, cheaper manufacture and the reduction of its external dimensions.

The contact arrangement of FIG. 2 corresponds substantially to that of FIG. 1 with the difference that reversing contacts are provided so that the application of the programme control is more universal and comparatively complex programmes can be controlled with few contacts.

The FIG. 2 embodiment provides for three possibilities of actuating the contacts which may be achieved by moving the contact actuating slides or the programme selector slides to the right. Thus, for example, by moving the first contact actuating slide to the right, the cam 277 to 280 connect the contact springs 273 and 274 of the associated contacts 268 to 271 by means of the actuating springs, while the separately arranged contact springs 272, 273 and 274 can make contact together via all three springs.

According to a further modification of this embodiment it is possible, by means of a hook-shaped actuating cam 282, to actuate always only the right contact of each set, namely to effect switching between the contact springs 273 and 274 of the sets 268 to 271. To this end the actuating cam 282 overlies in hook-shaped configuration the acuating spring 276 and presses, during the movement of the associated contact actuating slide, towards the right against the actuating spring 275, causing the spring 273 and the spring 274 to be deflected and the contacts to be closed. Another actuation is provided by a cam 283. Accordingly during the displacement of the contact actuating slide, only a small travel is transmitted to the associated contacts, so that only the springs 272 and 273 are closed by the associated contact actuating spring 276.

To this end the contact actuating cam 273 is slightly offset laterally on its slide so that only a part of the contact travel is used sufficient only for actuating the first two springs.

In a similar manner further actuating cams may be arranged on the programme selector slides as shown in FIG. 1 enabling the making of contacts by the contact actuating slides to be varied.

For the explanation of the operation of the programme control according to the invention it will be assumed that the programme control of FIGS. 1 and 2, and the associated circuit shown in FIG. 6 and FIG. 7 respectively is to be used for controlling the following five programmes:

First programme (ordinary wash)

1. Water inlet, level II (high), inlet I (wetting). Adding water when the level drops during the first wash
(2) First wash at temperature I
(3) Pumping off of washing solution
(4) Water inlet, level I (low), inlet 2
(5) Heating, thermostop with reversers, temperature II
(6) Full wash, subsidiary heating during the wash
(7) Adding water to II (high)
(8) Additional wash without heating
(9) Draining
(10) Water inlet
(11) Rinsing
(12) Draining The processes 10, 11 and 12 are repeated three times during the programme.

(13) Spin drying, short (1 minute)
(14) Water inlet
(15) Rinsing
(16) Draining
(17) Spin drying (dry—3 minutes)
(18) End of programme Second programme (e.g., boiling wash, dirty wash)

(1) Water inlet, Level II (high), inlet 1, wetting. Addition of water when the level drops during the first wash.
(2) First wash at temperature 1
(3) Draining washing solution (4) Water inlet, Level I (low), inlet 2, wetting
(5) Second first wash at temperature I
(6) Heating, thermostop with reversing, temperature II)
(7) Full wash, heating to boiling
(8) Draining
(9) Water inlet
(10) Rinsing
(11) Draining The processes 9, 10, 11 are repeated three times during the programme.

(12) Spin drying (short—1 minute)
(13) Water inlet
(14) Rinsing
(15) Draining
(16) Spin drying (dry spinning—3 minutes)
(17) Termination of programme Third programme (e.g. wool)

(1) Water inlet, level II (high), inlet 1
(2) First wash, temperature I
(3) Draining washing water
(4) Water inlet, level II (high), inlet 2
(5) Heating, thermostop, temperature I
(6) Washing
(7) Draining
(8) Water inlet
(9) Rinsing
(10) Draining
(11) Spin drying (short)
(12) Termination of programme Fourth programme (e.g., synthetic fibres)

(1) Water inlet, level II (high), inlet 1. Adding water when the level drops during the first wash
(2) First wash at temperature I
(3) Draining washing water
(4) Water inlet, level II (high), inlet 2
(5) Heating, thermostop, temperature I
(6) Washing, temperature I
(7) Draining
(8) Water inlet
(9) Rinsing
(10) Draining The processes 8, 9 and 10 are repeated three times during the programme.

(11) Water inlet
(12) Rinsing
(13) Interval
(14) Draining
(15) Spin-drying (short)
(16) Termination of programme Fifth programme (e.g., wash to be soaked)

(1) Water inlet, level II (high), inlet 1 (wetting). Addition of water, when the level drops during the first wash.
(2) First wash at temperature I, washing.
(3) Interval in programme (soaking overnight)
(4) Draining first washing water
(5) Water inlet, level I (low), inlet II (wetting)
(6) Heating, Thermostat, temperature II
(7) Washing, full wash, additional heating during the washing
(8) Draining full wash water
(9) Water inlet
(10) Rinsing
(11) Draining The processes 9, 10 and 11 are repeated three times during the programme.

(12) Spin-drying (short—1 minute)
(13) Water inlet
(14) Rinsing
(15) Draining
(16) Spin-drying (dry spinning, 3 minutes)
(17) Termination of programme The programme phases of these five programmes are combined to a maximum programme on a programme carrier 194 (FIG. 1), or 195, 194 (FIG. 2), as known per se. The unwanted phases of the programme are eliminated, in accordance with the selected programme, e.g., by overrunning. The programme carrier 194 (FIG. 1) or 194, 195 (FIG. 2) is in the embodiment (FIGS. 1 and 2a) a rotary switch, having at least one electrically insulating disc with circular or part circular metal elements (205 to 216).

In addition, the invention provided programme selector keys 114 to 117 and programme selector slides 68 to 76 for actuating different individual contacts 95 to 98, and 268 to 271, respectively, affording further possibilities for varying the programme. This has the advantage that the costs of the maximum programme carrier can be correspondingly reduced.

It is an essential feature of the invention that the programme selector slides are arranged with the contact actuating slides directly in the programme control apparatus and that both actuating members are associated at least partly with common contacts and sets of spring contacts. It is another essential feature of the invention that, in addition to the programme selection by means of a maximum programme carrier, additional variations of the programme can be effected by individual switching processes in that the programme selector slides can act directly on the contacts provided for controlling the individual programme processes to be varied, in order to prevent the actuation of at least some contacts and/or to hold at least some contacts open or closed either temporarily or continuously.

By means of the programme selector slides, in the five programmes described above, the following processes are initiated by directly affecting the contacts provided for this purpose and at least partly in common to both actuating members:

(1) In Programme I: the subsequent heating
(2) In Programme II: the boiling
(3) In Programme III: level 2, temperature I, slow running
(4) In Programme IV: level 2, temperature I, slow running
(5) In Programme V: the subsequent heating The combination of the various programme phases mentioned in the said five programmes, insofar as these cannot be selected directly by the programme selector slides, yields the following maximum programme:

(0) Switched off position
(1) Water inlet, level II, inlet 1
(2) First wash, temperature I, washing
(3) Draining
(4) Water inlet, level I, inlet 2
(5) Second pre-wash, temperature I, washing
(6) Interruption of programme for soaking overnight
(7) Heating, thermostop with slow running, temperature II
(8) Main wash
(9) Topping up with water to level II
(10) Finishing wash without heating
(11) Draining
(12) Water inlet, level II, inlet 1
(13) Rinsing
(14) Draining
(15) Water inlet
(16) Rinsing
(17) Draining
(18) Water inlet
(19) Rinsing
(20) Draining

(21) Water inlet, level II, inlet 1
(22) Rinsing
(23) Interruption of programme for synthetic fibres
(24) Draining
(25) Short spin-drying, 1 minute
(26) Water inlet
(27) Rinsing
(28) Draining
(29) Dry spinning, 3 minutes
(30) Switching off When the maximum programme is examined for the type of different programme phases, it can be seen that a large number of them represent phases which have already been performed. It may be seen that the thirty programme phases require, in fact, only nine contact positions, including the "off" position, i.e., this programme could be performed by means of the programme controller according to the invention, as above described, and comprising eight contact actuating slides.

This is due to the fact that, owing to the control principle of the programme control apparatus according to the invention, repetitions of switching processes require no extension of the programme switching means, and only the actually occurring contact positions are stored by the actuating slides and are initiated as required. In addition, the combination of pragramme selector slides and contact actuating slides according to the invention makes it possible to operate the contacts additionally by means of the programme selector slides, saving further programme phases, resulting finally in the above-mentioned number of nine different programme positions which must be performed by the programme control. For the whole maximum programme, the following contact positions are necessary:

(0) OFF position
(1) Water inlet, level II, inlet 1
(2) First wash at temperature I
(3) Draining
(4) Water inlet, level I, inlet 2
(5) Heating thermostop with slow running, temperature II
(6) Main wash
(7) Rinsing
(8) Spin drying The following programme phases are eliminated from the maximum programme for controlling the individual programmes:

(1) Programme I (a) Programme selection phase 5: second preliminary wash
(b) Programme selection phase 6: Interruption of programme for soaking overnight
(c) Programme selection phase 21: Water inlet
(d) Programme selection phase 22: Rinsing
(e) Programme selection phase 23: Interruption of programme for synthetic fibres
(f) Programme selection phase 24: Draining By actuating the programme selecting slide for Programme I, the contacts initiating the re-heating are simultaneously opened.

(2) Programme II (a) Programme selection phase 6: Interruption of programme for soaking overnight
(b) Programme selection phase 9: Addition of water to level II
(c) Programme selection phase 10: Rinsing without heating
(d) Programme selection phase 21: Water inlet
(e) Programme selection phase 22: Rinsing
(f) Programme selection phase 23: Interruption of programme for synthetic fibres
(g) Programme selection phase 24: Draining.

By actuating the programme selecting slide for programme II, the contacts for the boiling heating are simultaneously opened.

(3) Programme III (a) Programme selection phase 5: second pre-wash
(b) Programme selection phase 6: Interruption of programme for soaking overnight
(c) Programme selection phase 9: Addition of water to level II
(d) Programme selection phase 10: Rinsing without heating
(e) Programme selection phase 21: Water inlet
(f) Programme selection phase 22: Rinsing
(g) Programme selection phase 23: Interruption of programme for synthetic fibres
(h) Programme selection phase 24: Draining
(i) Programme phase 26: Water inlet
(k) Programme phase 27: Rinsing
(l) Programme phase 28: Draining
(m) Programme phase 29: Dry spinning By actuating the programme selector slide for Programme III, the switching means for level II, slow running and temperature I are affected preparatorily.

(4) Programme IV (a) Programme phase 5: second preliminary wash
(b) Programme phase 6: interruption of programme for soaking overnight
(c) Programme phase 9: Adding water to level II
(d) Programme phase 10: Rinsing without heating
(e) Programme phase 26: Water inlet
(f) Programme phase 27: Rinsing after main wash
(g) Programme phase 28: Draining
(h) Programme phase 29: Dry spinning By actuating the programme seelctor slide for Programme IV the contact means for Level II, slow running and temperature I are preparatorily affected.

(5) Programme V (a) Programme phase 5: second preliminary wash
(b) Programme phase 9: Addition of water to level II
(c) Programme phase 10: Rinsing without heating
(d) Programme phase 21: Water inlet
(e) Programme phase 22: Rinsing
(f) Programme phase 23: Interruption of programme for synthetic fibres
(g) Programme phase 24: Draining By initiating the programme selector slide for Programme V, the contacts initiating the re-heating are simultaneously liberated.

The maximum programme will now be described with reference to the circuit diagrams in FIGS. 6 and 7, respectively.

In order to energize the programme control and the appliance controlled thereby, one of the keys P1 to P4 is depressed, in accordance with the programme to be chosen; this closes the main contacts HS1 and HS2; the lamp L1 lights up. At the same time, a certain track of the eliminator is selected and the elimination programme is prepared. The key is fully depressed and thereby operates the associated contacts S1 and S2, causing voltage to be applied to the motor ASM which starts up immediately, and its contacts *asm* is closed by means of the cam disc 59. For programmes programmed to run without interruption, the selector slide also closes the contacts K18. At the same time, the coupling magnet AKM C51 is energized through switch S1, actuates a contact *ekm* and causes also, by closing the coupling, an accelerated transmission of the torque to the shaft 12 in FIGS. 1 and 2, so that the cam wheel 17 is driven at fast speed, causing the programme switching shaft 39 to be advanced quickly. During this process, the contacts *ekm* is switched from 1 to 2, causing the downstream switching apparatus to be de-energized during the elimination and avoiding unnecessary switching on and off. The coupling magnet EKM remains closed during one rotation of the shaft 5, and after this rotation, the contact opens again and the coupling magnet EKM is de-energized and released, and the cam 17 is again driven normally through the gearing provided therefor. During the rotation of the coupling 51, causing the programme elimination, the plungers 46 to 49 and the coding pins 64 to 67 (FIGS. 1 and 2) are moved so that the first slide for the contact actuation, namely the side for the contact position "Water inlet level II," inlet 14 engages with its notches the plungers and the following contacts are closed:

K1, K4, K7, K11, K13, K18 and K19

When the actuation, serving to initiate the programme, is terminated and the contact *ekm* has returned into its position 1, the magnetic coil EV1 of the inlet valve 1 is energized through US1, K4, $N2_1$ and K19, and opens the inlet valve 1.

When the level II has been reached, N2 switched from the position 1 to the position 2, causing EV1 to be de-energized and closed, applying simultaneously through the reversed contact $N2_2$ and the closed contact K7 which bridges the contact R$vs$1, voltage through R$sv$2 to the motor of the washing machine. The washing machine starts immediately with the washing, during which the direction of the washing machine motors is continuously reversed by the change in the position of the contact R$vs$2 between positions 1 and 2, i.e. the motor is reversed. The starting of the motor is possible by virtue of a capacitor C, connected via the contacts K11 and K13. During the washing motion of the drum, a part of the water is absorbed by the material to be washed, causing its level in the drum to drop. When the level drops below a minimum, the level switch N2 switches from position 2 to position 1, causing the inlet valve EVS1 to open, and more water flows into the drum. After the termination of this process, the level switch N2 switches again from position 1 to position 2, whereby the drum of the washing machine is again set in motion by the motor. With the water through EV1, the washing agent is simultaneously fed into the drum for the first preliminary wash.

After this first programme phase, which is terminated after one to two minutes, the actuating members change their position, and the hitherto active programme selector slide is returned to the stack. A new slide, associated with programme phase "2" of the maximum programme, namely the first preliminary wash, is entrained by the coding pins in their new position. During this first preliminary wash, a heating element for the temperature I is switched on and the washing is effected as full washing operation. In the embodiment shown, the temperature I is not thermally monitored, but one of the two heating elements, e.g., H1, is switched on through the contact K5, causing the temperature "T1" to occur substantially during the preliminary washing period. At the start of the programme phase 2 of the maximum programme, contacts K4 and K19 are opened, while the contacts K1, K7, K11, K13, K18 remain closed. However, it is also possible to obtain a thermal control (thermostop) also for the preliminary wash by closure of contact K2.

Contact K1 applies, by way of preparation, a voltage to a monitoring magnet UM through the "Running dry protector TGS."

The "Running dry protector" is a protecting and warning device, which has the object of preventing revolution of the drum without water, i.e., dry. During the first programme phase, the monitoring magnet UM has the object of preventing the engagement of the next phase by means of the programme shaft 39 in the case of failure of water to flow into the drum until either water begins to flow, or the machine is switched off.

The monitoring magnet UM acts directly on the advance of the programme control shaft 39, for example, by releasing the advance ratchet, by means known in the art and not shown in the drawing so that the advance does not take place, in spite of the reciprocating switching lever 20. For the sake of safety, the magnet remains energized also during the second phase in order to prevent switching to the programme phase 3 of the maximum programme and switching on of the heating, after the water has been drained off.

The monitoring magnet UM is also affected by the monitoring switch US which moves from position 1 to position 2 in the case of failure of one of the level switches N1 or N2, causing the water to overflow, applying therefore a voltage to the magnet UM. This prevents the next phase to be engaged and simultaneously, the voltage is removed by the monitoring switch US switching from position 1 to position 2, deenergizing the valves EV1 and EV2, causing them to close. Since the contact K4 has opened, the washing machine motor is supplied through contact K8 which has been closed with K5.

During the change-over to maximum programme phase 3, i.e., draining the contacts K1 and K5, K7, K8, K11 and K13 are opened, while the pump conatct K10 is closed. The pump pumps the dirty water from the first wash into the outlet. Contact K18 remains closed during this phase.

Now follows the programme phase 4 of the maximum programme, namely the inlet to level 1 through inlet 1.

The contacts K10 is opened and the pump is stopped. At the same time, contacts K1, K3, K4, K7, K11, K13 and K17 close and contacts K18 remains closed. The inlet valve EV2 is energized through the monitoring switch US, the level switch N1 and the contact K17, opens, and carries along the washing agent for the main wash into the washing machine. When the level switch N1 has reversed itself after the desired water level has been reached, the inlet valve EV2 is de-energized and closes. At the same time, the motor of the washing machine is energized through $N1_2$, contact K7 and reversing contact R$vs$2 and starts the wash again during this phase. Simultaneously, the overflow protection checks whether the level switches work and the closed contact K1 checks the presence of liquid in the drum, prior to switching to the next phase, at which the heating elements are again engaged to temperature 1.

After this phase follwos programme phase 5 of the maximum programme, the so-called second preliminary wash. This phase corresponds fully to phase 2; also the actuations of the contacts and the opening actions thereof are the same.

After the termination of programme phase 5, i.e., the "second preliminary wash," phase 6 is initiated, namely the interruption of the programme for soaking overnight. During this phase, the contact actuating slides assume their "OFF" positions, but the depressed actuating key associated with the selected programme remains in the depressed state. The main contacts ES1 and HS2 remain closed, the lamp L1 remains lit up to indicate the operational readiness, and the lamp L2 goes out. All contacts are opened and the synchronous motor ASM is de-energized through its contacts *asm*, since during this phase of the programme, the contact K18 had not been operated. Apart from the main contacts HS1 and HS2 and the lamp L1, the installation is inoperative.

The continuation of programme phase 6, the transition to programme phase 7, the so-called "full heating with thermostop" is initiated by fully pushing in the key, with which the overnight soaking interval is associated, until the lamp L2 lights up. At the same time, the coupling magnet EKM is energized via S1 and effects the quick transition to the next programming stage.

Transition to programme phase 7 is now effected, namely to "Full heating with thermostop, temperature 2". The contacts K2, K5, K6, K8, K11, K13 and K18 close.

The contact K2 energizes the monitoring magnet UM via the thermostat, and prevents, through the branch 2 of the said thermostat Th, the advance of the programme control shaft 39 until the wash water has reached the required temperature. Only then can the programme continue. The contacts K5 and K6 energize both heating elements, switching on the entire heating of 3 kW. Contact K switches on the motor of the washing machine via the windings W1, W2, W3, wherein interference between the contact actions of R$vs$1 and R$vs$2 causes slow running to protect the laundry during the heating up. Contact K18 energizes the asynchronous motor ASM independently of its cam contacts $asm$, and the starting up of the drum is effected through the shunt connection between the capacitor C and winding W3 of the motor MR of the washing machine through the contacts K11 and K13.

The advance of the programme control shaft 39 can take place after the opening of a thermostat contact 2 in that the monitoring magnet UM is de-energized and releases the ratchet. The water has reached the required temperature and the next advance of the shaft 39 initiates phase 8 of the maximum programme, the "full wash."

At "Full wash," contacts K2, K5 and K6 open and contacts K7 and K9 close. The contacts K8, K11, K13 and K18 remain closed from the preceding phase 7.

Closure of contact K7 short-circuits the contact R$vs$1, forming a beat cycle with contact R$vs$2. This cancels the slow running and initiates running at full speed. The drum operates now in continuous to-and-fro motion until the "full wash" is terminated.

Closure of contact K9 makes possible the so-called re-heating. Opening of contacts K5 and K6 caused the switching off of the heating elements. However, contact K9 and the contacts R$vs$3, actuated by the reversing switch, enable the heating element H2 to be energized in a certain sequence so that the temperature of the washing water is maintained substantially to the end of the full wash, by applying an average input of about 750 w. Contact K9 is always closed during maximum programme phase 8, but the programme selector slides mechanically prevent the closure of contact K8 during the run of programmes II, III and IV, since this re-heating is desirable only in programmes I and V.

After the end of maximum programme phase 8 ("Full wash") follows the initiation to phase 9 "addition of water to level II."

This may be desirable in some cases and has been provided for Programme I. Since the addition of a washing agent is here unnecessary, this phase represents, in fact, a repetition of phase 1, i.e., filling with water to level II through inlet 1: contacts K8 and K9 open, contacts K1, K4 and K9 close, and contacts K11, K13 and K18 remain closed.

The next phase 10 comprises rinsing without heating: here the contacts K1, K4 and K19 open, while contact K8 closes and contacts K11, K13 and K12 remain closed. This phase 10 is already initiated during the preceding phase 9, when the level switch N2 has switched from position 1 to position 2. Then the windings W1, W2, W3 of the washing machine motor are energized through the contacts K4 and K7 and contacts R$vs$2.

The next phase 11 corresponds again to programme phase 3 "Draining"; contacts K7, K8, K11 and K13 open and contact K10 closes. Contacts K18 remains closed.

The programme phases 12 to 24 of the maximum programme are repetitions of the phases 9, 10 and 11, entailing the charging of the drum with water and the rinsing. Phase 23 relates to an interruption of the run of the programme for materials of synthetic fibres, in which the laundry remains overnight in the rinsing water, to prevent the material from being crushed during the spin-drying.

Programme phase 23 corresponds to phase 6, including the re-starting of the programme, as described above.

After the rinsing has been repeated three times, the laundry is briefly centrifuged or "spun" in phase 25. This short spin drying lasts for about 1 minute and is initiated as follows: Contacts K10 and K18 remain closed, while the contacts K12, K14 and K15 are closed for the first time. Contact 18 remains closed as in all phases except phases 6 and 23. The contacts K12 and K14 connect the capacitor C in parallel to the spin winding WS1 of the washing machine motor, while the winding WS2 is connected through the contact K15. At the same time, contact K10 maintains the water pump in action so that the water removed from the material by the spinning action is immediately removed by the pump.

After the short spinning there follows a second rinsing period with water filling, rinsing and pumping, comprising the programme phases 26, 27 and 28, followed by programme phase 29, the so-called dry spinning, lasting for about three minutes; the positions of the contact during this last phase corresponds to phase 25 (spin drying for 1 minute).

Then follows the switching off, which is simultaneously the starting position for a new programme.

By means of the common control of the contacts by the contact actuating slides and by the programme selector slides, which is an essential feature of the invention, the latter actuate during the different phases and programmes, the following contacts:

K3, K6, K7, K9, K16, K18, K20 and K21

Programmes I and V comprise "re-heating" during the "full wash" phase, i.e., during the transition from phase 7 (thermostop) to phase 8 (full wash), contacts K5 and K6 are opened, but the heating element H2 is energized periodically also during the full wash via the contact K9 and the reversing contact R$vs$3, giving a mean output of 750° w. to maintain the temperature of the washing water.

The contact K9 is closed in each programme during the initiation of the "Full wash" phase by the associated contact actuating slide; however, during the run of programmes II, III and IV, where re-heating is not desirable or required, the programme selector slides prevent closure of contact K9 by directly and mechanically affecting the associated set of springs.

Opening of contact K18 takes place only in programmes IV and V, and is prevented in all other programmes by the programme selector slide.

Similarly, in all programmes where heating to the boiling point is undesirable (i.e., programmes I, III, IV and V), this is prevented by contacts K20 and K21 under the action of the programme selector slide. With the initiation of the "Full wash" phase, contacts K20 and K21 close and cause the heating of the washing water to the boiling point. If this is to be prevented, the programme selector slides initiating this programme (either programme I, or III, or IV or V) mechanically prevent the closing of the contacts K20 and K21.

Conditions are again similar in programmes III and IV, where Level II, slow running and temperature I are provided. Level II control is effected in that in phase 4 (water inlet I, inlet 2) both contacts K3 and K4 are always closed. In programmes III and IV, the contact K3 is prevented from closing while contact K16 closes. Also here, the contact K3 is affected directly via its springs, preventing it from being closed in spite of the actuation by the contact actuating slide. Thus, programme phase 4 is not controlled by the level switch N1, but by the level switch N2, causing the inlet valve EV2 to be actuated through contact K4, contact 1 of N2, contacts K16 and K17.

Similarly, in Programmes III and IV, the washing action is altered to slow running by preventing contact K7 from closing, again by means of the programme selector slides for programmes III and IV, although the associtaed contact actuating slides would cause this contact to close.

Programmes III and IV require again temperature I, and this necessitates in turn direct action by the programme selector slides for programmes III and IV so that the normally closing contact K6 is prevented from closing. Contact K5 which becomes effective actuates therefore contact T$h$1 so that the thermostop is actuated at the lower temperature 1 and the transition to the full washing action takes place at this lower temperature.

Obviously, the direct action of the programme selector slides on the contacts reduces considerably the expenditure required for the switching means. Thus, in the embodiment mentioned, further contacts would have to be provided for the contacts K18, K7, K6 and K3, as well as for contact K9, and these would have to be connected partly in parallel and partly in series in order to provide the same effect as is achieved here by the direct action of the programme selector slides on the contacts common to them and to the contact actuating slides.

What we claim is:

1. An electrical program control device comprising a coding device having a cylindrical shaped storage element on which coding symbols corresponding to a program to be controlled are arranged, a mechanical decoder coupled with said coding device and including a plurality of rods by which the coding symbols are convertible into electrical contact actuations by longitudinal movement of selected rods of the plurality of rods, electrical switch means providing said electrical contact actuations, a manually actuatable control device for effecting program selection, and means coupled to said mechanical decoder and said manually actuatable control device for converting movement thereof into electrical contact actuations by acting on said electrical switch means, the latter means comprising a first group of displaceable slides engageable by said rods for being selectively displaced thereby, and a second group of displaceable slides engageable by said manually actuatable control device for being selectively displaced thereby, the displacement of the slides controlling electrical contact actuations and thereby the operation of said electrical switch means, said slides being parallel and arranged one behind the other, said mechanical decoder comprising a drive mechanism constituted by a plurality of elements arranged one behind the other in an arrangement adjacent said slides, said first group of slides having edges with U-shaped recesses therein forming cams engaging said electrical switch means, said second group of slides being in registry with said first group and including abutments engaging said switch means, and actuating keys for program selection.

2. A device as claimed in claim 1 wherein said electrical switch means comprises electrical contacts accommodated in the U-shaped recesses of the slides, said contacts being spring elements and arranged inside the recesses parallel to said cams constituting the U-shaped recesses, said spring elements having abutments extending perpendicular to the direction of displacement of the first group of displaceable slides which upon sliding movement of the slides are actuatable by said cams.

3. A device as claimed in claim 1 comprising a common flat housing for said drive mechanism and said first group of displaceable slides, and means supporting said housing and the other elements of the device as an enclosed structural unit, the latter having an indicator for the state of the program.

4. A device as claimed in claim 3 wherein said keys project from said unit and said indicator is adjacent said keys.

5. A device as claimed in claim 1 wherein said first group of displaceable slides have side edges with notches, said rods being selectively engaged in said notches to move the slides.

References Cited

UNITED STATES PATENTS

| | | |
|---|---|---|
| 3,073,928 | 1/1963 | Olsson. |
| 3,109,073 | 10/1963 | Lewis et al. |
| 3,247,335 | 4/1966 | Holzer. |
| 3,253,108 | 5/1966 | Mumma. |

HERMAN O. JONES, Primary Examiner